US006219037B1

United States Patent
Lee

(10) Patent No.: US 6,219,037 B1
(45) Date of Patent: Apr. 17, 2001

(54) POINTING DEVICE PROVIDED WITH TWO TYPES OF INPUT MEANS FOR A COMPUTER SYSTEM

(75) Inventor: Kwan-Ho Lee, Kwacheon-shi (KR)

(73) Assignee: Samsung Electronics Co., Ltd., Suwon (KR)

(*) Notice: Subject to any disclaimer, the term of this patent is extended or adjusted under 35 U.S.C. 154(b) by 0 days.

(21) Appl. No.: 09/165,359

(22) Filed: Oct. 2, 1998

(30) Foreign Application Priority Data

Oct. 2, 1997 (KR) .................................................. 97-51054

(51) Int. Cl.[7] ....................................................... G09G 5/08
(52) U.S. Cl. ........................ 345/167; 345/156; 345/157; 345/158; 345/163; 345/168; 345/169
(58) Field of Search .................................. 345/163, 167, 345/168, 157, 156, 158, 169

(56) References Cited

U.S. PATENT DOCUMENTS

| | | |
|---|---|---|
| 4,754,268 | 6/1988 | Mori . |
| 5,231,380 * | 7/1993 | Logan .................................. 340/706 |
| 5,428,368 | 6/1995 | Grant . |
| 5,546,334 | 8/1996 | Hsieh et al. . |
| 5,654,740 * | 8/1997 | Schulha ................................ 345/156 |
| 5,726,684 * | 3/1998 | Blankenship et al. ............... 345/167 |
| 5,793,355 * | 8/1998 | Youens ................................. 345/157 |
| 5,793,359 | 8/1998 | Ushikubo . |
| 5,877,745 * | 3/1999 | Beeteson et al. ..................... 345/156 |
| 5,886,686 * | 3/1999 | Chen .................................... 345/168 |

* cited by examiner

Primary Examiner—Richard Hjerpe
Assistant Examiner—Jean Lesperance
(74) Attorney, Agent, or Firm—Robert E. Bushnell, Esq.

(57) ABSTRACT

A pointing device mounted in a portable computer having a system unit for data processing, wherein the pointing device comprises a housing detachably attached to the portable computer, and a first and second input means formed integrally with the housing, wherein the first input means is used for data input by making wireless data communication with the system unit when the housing is detached from the portable computer, and the second input means is directly connected with the system unit through a cable for data input when the housing is attached directly to the portable computer. Preferably, the housing may be detachably mounted in a seat provided in the system unit of the portable computer. The first and second input means are respectively a ball type mouse and a touch pad. Thus, the pointing device may be selectively used as a ball type mouse when detached from the system unit or as a touch pad when attached to the system unit. Used as the ball type mouse, the pointing device transfers the pointing data to the system unit by means of a radio transmitter. Used as the touch pad, the pointing device transfers the pointing data to the system unit by means of cable connection.

30 Claims, 13 Drawing Sheets

POINTING DEVICE PROVIDED WITH TWO TYPES OF INPUT MEANS FOR A COMPUTER SYSTEM

CLAIM OF PRIORITY

This application makes reference to, incorporates the same herein, and claims all benefits accruing under 35 U.S.C. § 119 from an application entitled Pointing Device Provided With Two Types of input Means For a Computer System earlier filed in the Korean Industrial Property Office on the $2^{nd}$ day of October 1997, and there duly assigned Serial No. 51054/1997, a copy of which is annexed hereto.

BACKGROUND OF THE INVENTION

1. Technical Field

The present invention relates to a device inputting data to a computer system, and more particularly to a pointing device inputting pointing data to a portable computer system.

2. Related Art

Computer systems are information handling systems that are utilized by many individuals and businesses today. A computer system can be defined as a microcomputer that includes a central processing unit (CPU), a volatile memory, a non-volatile memory, a display monitor, a keyboard, a mouse or other input device such as a trackball, a floppy diskette drive, a compact disc-read only memory (CD-ROM) drive, a modem, a hard disk storage device, and a printer. Typically, a computer system's main board, which is a printed circuit board known as a motherboard, is used to electrically connect these components together.

Portable computers are often referred to as laptop, notebook, or subnotebook computers. These computers typically incorporate a flat panel display such as a liquid crystal display (LCD) or other relatively small display. Portable computers also often provide for coupling to a conventional standalone display monitor and also often provide for coupling to an external input device such as an external mouse or trackball.

A computer is usually equipped to use a "mouse" for movement of a cursor and initiating other functions of the computer. The mouse has a rotatable ball and is known as an input device which is also a pointing device. Typically, one pointing device is provided as the input device for a portable computer. For example, a portable computer may include a trackball input device incorporated in the housing of the portable computer. Or the portable computer may include a touchpad input device incorporated in the housing of the portable computer. The trackball input device is a pointing device since it inputs pointing data or positional coordinate data to the computer. The touchpad input device is also a pointing device.

Problems that can occur include the following. Since these input devices are fixedly mounted to the housing of the portable computer, errors can occur due to unintentional touching of the input device. Also, a user may be accustomed to using a trackball and may prefer to use a trackball in lieu of a touchpad. However, if a particular portable computer includes only a touchpad, that user must use the touchpad, even though that device is not the preferred input device.

Exemplars of recent efforts in the art include U.S. Pat. No. 5,793,359 for a System For RF Communication Between a Computer And a Remote Wireless Data Input Device issued to Ushikubo, //U.S. Pat. No. 5,726,684 for a Detachable Convertible Mouse-Trackball Pointing Device for Use with a Computer issued to Blankenship et al., U.S. Pat. No. 5,546,334 for a Notebook Computer System with a Separable Trackball issued to Hsieh et al., U.S. Pat. No. 5,428,368 for a Combination Mouse and track Ball Unit issued to Grant, and U.S. Pat. No. 4,754,268 for a Wireless Mouse Apparatus issued to Mori.

While these recent efforts provide advantages, I note that they fail to adequately address how an improved input unit including two types of pointing devices can be provided conveniently and efficiently at a computer system, thereby adding versatility to the computer system.

SUMMARY OF THE INVENTION

It is an object of the present invention to provide a pointing device for a notebook computer, which has both the ball type data input means and the touch pad type input means to selectively use.

It is another object of the present invention to provide a pointing device with both types of input means, which may be detachably mounted in a notebook computer, and thus operated in wireless data communication with the computer in the detached state.

According to an embodiment of the present invention, a pointing device mounted in a notebook computer having a system unit for data processing and a display, comprises a housing detachably attached to the notebook computer, and a first and a second input means formed integrally with the housing, wherein the first input means is used for data input by making a wireless data communication with the system unit when the housing is detached from the computer, and the second input means is directly connected with the system unit through wire for data input when the housing is attached to the computer. Preferably, the housing may be detachably mounted in a seat provided in the system unit. The first and second input means are respectively a ball type mouse and a touch pad. Thus, the pointing device may be selectively used as a ball type mouse when detached from the system unit or as a touch pad when attached to the system unit. Used as the ball type, the pointing device transfers the pointing data to the system unit by means of a radio transmitter, and as the touch pad, it transfers the pointing data to the system by means of wire connection.

To achieve these and other objects in accordance with the principles of the present invention, as embodied and broadly described, the present invention provides a pointing apparatus for use with a computer, comprising: an apparatus housing being removably attached to a host computer and having first and second spaced-apart surfaces; a first input unit being formed integrally with said apparatus housing and generating first pointing data to be conveyed to said host computer via wireless communication when said apparatus housing is not attached to said host computer, said first pointing data corresponding to position coordinate information; and a second input unit being formed integrally with said apparatus housing and generating second pointing data to be conveyed to said host computer via an electrical connector when said apparatus housing is attached to said host computer, said second pointing data corresponding to said position coordinate information.

To achieve these and other objects in accordance with the principles of the present invention, as embodied and broadly described, the present invention provides a pointing apparatus for use with a host computer, comprising: an apparatus housing being removably attached to a host computer and having first and second spaced-apart surfaces; a plurality of input keys being mounted to said apparatus housing and inputting key data to said apparatus to be conveyed to said host computer; a first input unit being formed integrally with said apparatus housing and generating first pointing data to be conveyed to said host computer via wireless communication when said apparatus housing is not attached to said host computer, said first pointing data corresponding to position coordinate information; a second input unit being formed integrally with said apparatus housing and generating second pointing data to be conveyed to said host computer via an electrical connector when said apparatus housing is attached to said host computer, said second pointing data corresponding to said position coordinate information; a switching unit outputting a selection signal when said apparatus housing is attached to said host computer, and not outputting said selection signal when said apparatus housing is not attached to said host computer; a control unit receiving said selection signal from said switching unit, and controlling said first pointing data and said second pointing data in accordance with said selection signal, said second pointing data being transmitted as an electrical signal to said host computer via said electrical connector when said selection signal is received, and said first pointing data being transmitted as a wireless signal to said host computer via said wireless communication when said selection signal is not received; a radio transmitter unit transmitting said first pointing data as said wireless signal to said host computer; said electrical connector transmitting said second pointing data as said electrical signal to said host computer; and a battery supplying power to said apparatus.

To achieve these and other objects in accordance with the principles of the present invention, as embodied and broadly described, the present invention provides a computer apparatus, comprising: a system unit processing computer information; a display unit displaying varying visual information corresponding to said computer information and being controlled by said system unit; a housing removably mounted in a cavity defined by said system unit; and first and second input units formed integrally with said housing, said first input unit generating first pointing data to be conveyed to said system unit via wireless communication when said housing is not mounted in the cavity defined by said system unit, and said second input unit generating second pointing data to be conveyed to said system unit via a first electrical connector when said housing is mounted in the cavity defined by said system unit.

The present invention is more specifically described in the following paragraphs by reference to the drawings attached only by way of example. Other advantages and features will become apparent from the following description and from the claims.

BRIEF DESCRIPTION OF THE DRAWINGS

A more complete appreciation of the present invention, and many of the attendant advantages thereof, will become readily apparent as the same becomes better understood by reference to the following detailed description when considered in conjunction with the accompanying drawings in which like reference symbols indicate the same or similar components, wherein.

DETAILED DESCRIPTION OF THE PREFERRED EMBODIMENT

Typically, one pointing device is provided as the input device of a portable computer. For example, a portable computer may include a trackball input device incorporated in the housing of the portable computer, or the portable computer may include a touchpad input device incorporated in the housing of the portable computer.

A ball type input device is a pointing device which usually includes a housing mounted with a ball which is rotated to move the pointer displayed on the screen of the computer system. Such ball type pointing device is further divided into two subtypes, one of which is operated by moving the housing to rotate the ball, and the other by moving the ball itself with the housing securely fixed, which is conventionally called the trackball type pointing device (hereinafter referred to as "track ball"). The touchpad type pointing device (hereinafter referred to as "touch pad") employs an electrostatic sensing pad, whose surface is contacted by a finger moved to move the pointer displayed on the screen.

Figure 1:
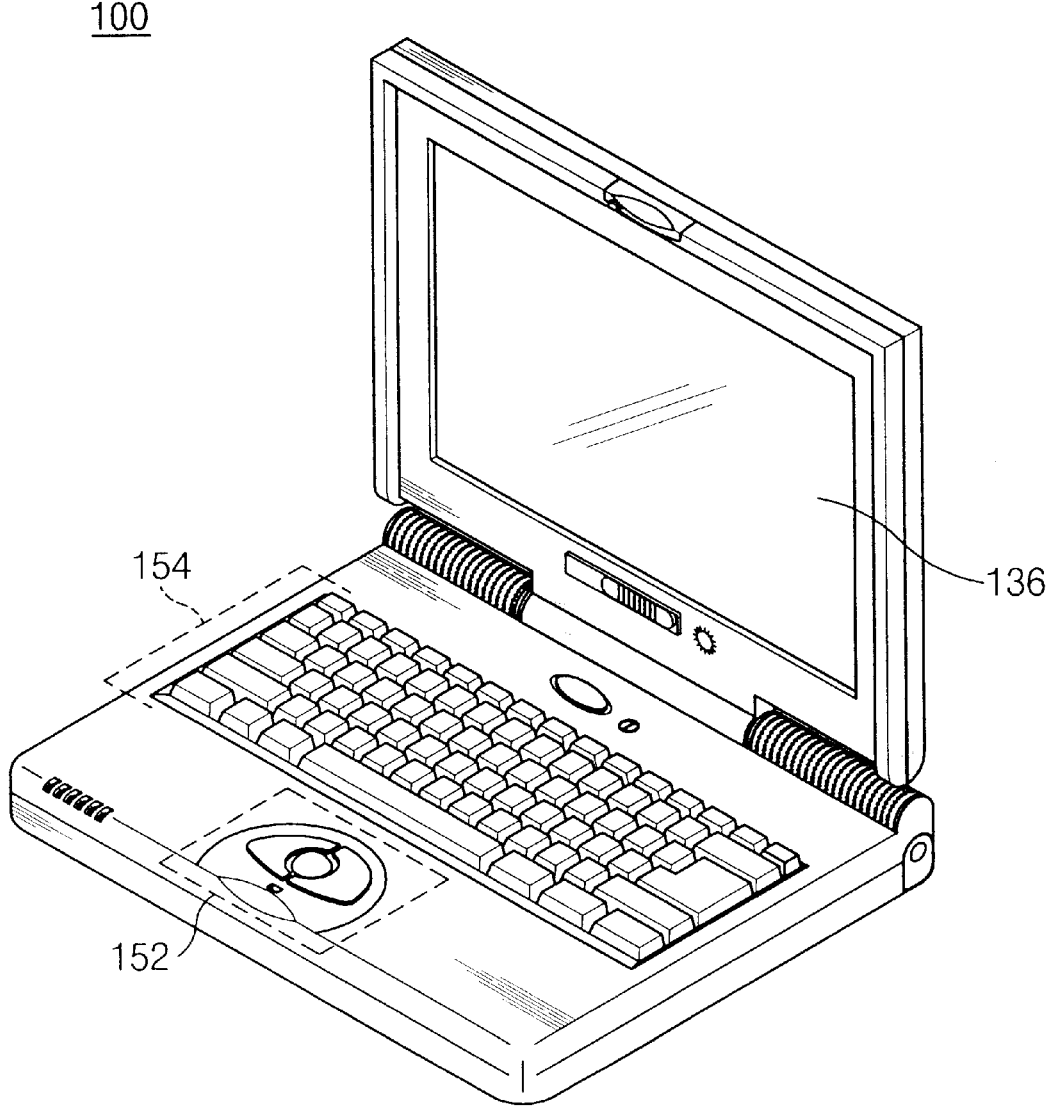
FIG. 1 illustrates a portable computer including a trackball input device.
Figure 2:
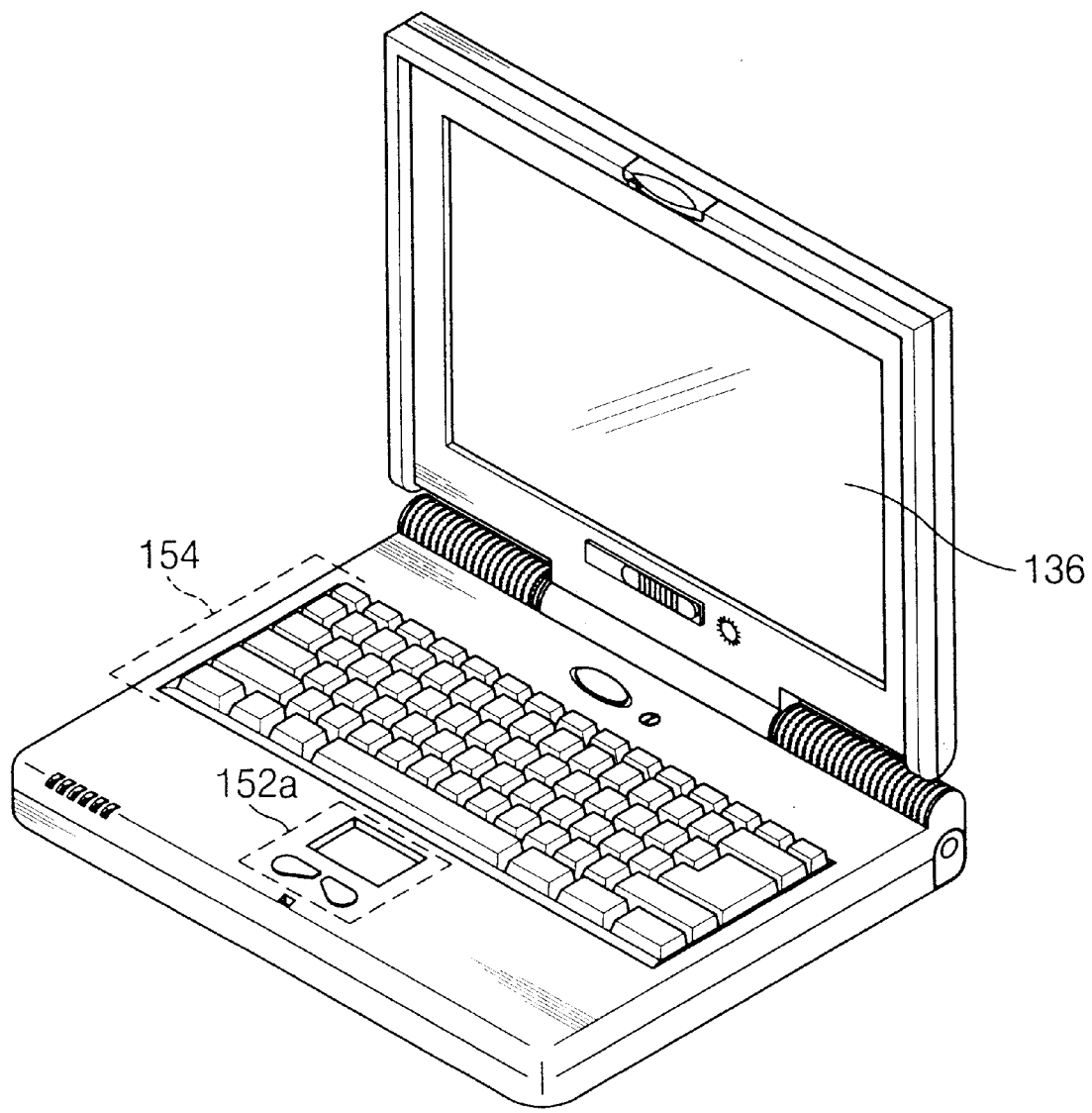
FIG. 2 illustrates a portable computer including a touchpad input device.

Refer now to FIG. 1, which illustrates a portable computer including a trackball input device. In FIG. 1, a portable computer 100, a liquid crystal display (LCD) 136 displaying varying visual images, a keyboard 154, and a trackball pointing device 152 are shown. In addition, there is an internal system unit containing a central processing unit (CPU) which is not shown. Refer now to FIG. 2, which illustrates a portable computer including a touchpad input device. In FIG. 2, a portable computer 100a, a liquid crystal display (LCD) 136 displaying varying visual images, a keyboard 154, and a touchpad pointing device 152a are shown. In addition, there is an internal system unit containing a central processing unit (CPU) which is not shown.

With continued reference to FIGS. 1 and 2, though these two types of data input units have their unique advantages for handling, it is also undeniable that one who has been accustomed with one type feels uncomfortable when forced to use the other type. Moreover, since such a pointing device is fixedly mounted in the notebook computer, there may easily occur, when computing, errors caused by unintentionally touching the pointing device especially in the case of the touch pad.

Figure 3:
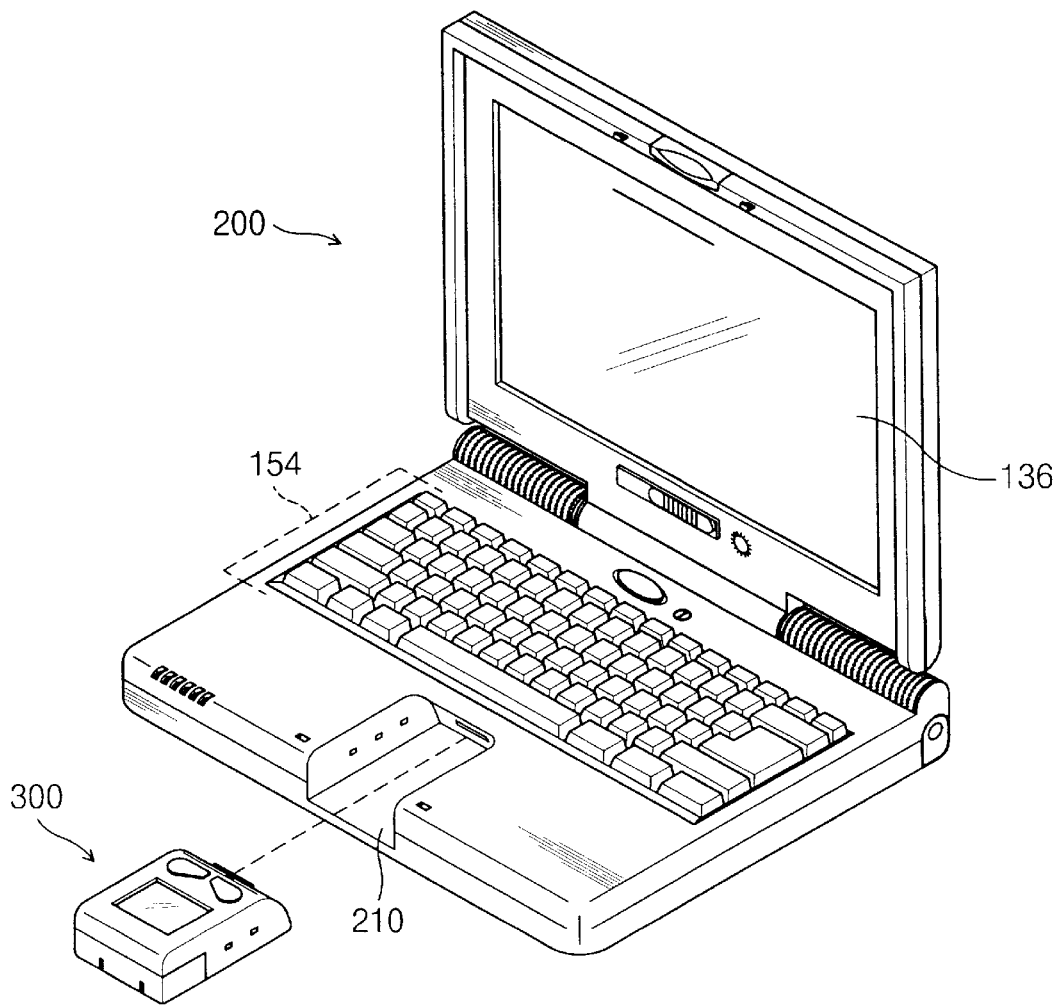
FIG. 3 illustrates a portable computer and an integrally formed mouse and touchpad input device, wherein the integrally formed mouse/touchpad is separated from the body of the portable computer, in accordance with the principles of the present invention.

Refer now to FIG. 3, which illustrates a portable computer and an integrally formed mouse and touchpad input device, wherein the integrally formed mouse/touchpad is separated from the body of the portable computer, in accordance with the principles of the present invention. Also, refer to FIG. 4, which illustrates a portable computer and an integrally formed mouse and touchpad input device, wherein the integrally formed mouse/touchpad is not separated from the body of the portable computer, in accordance with the principles of the present invention.

Figure 4:
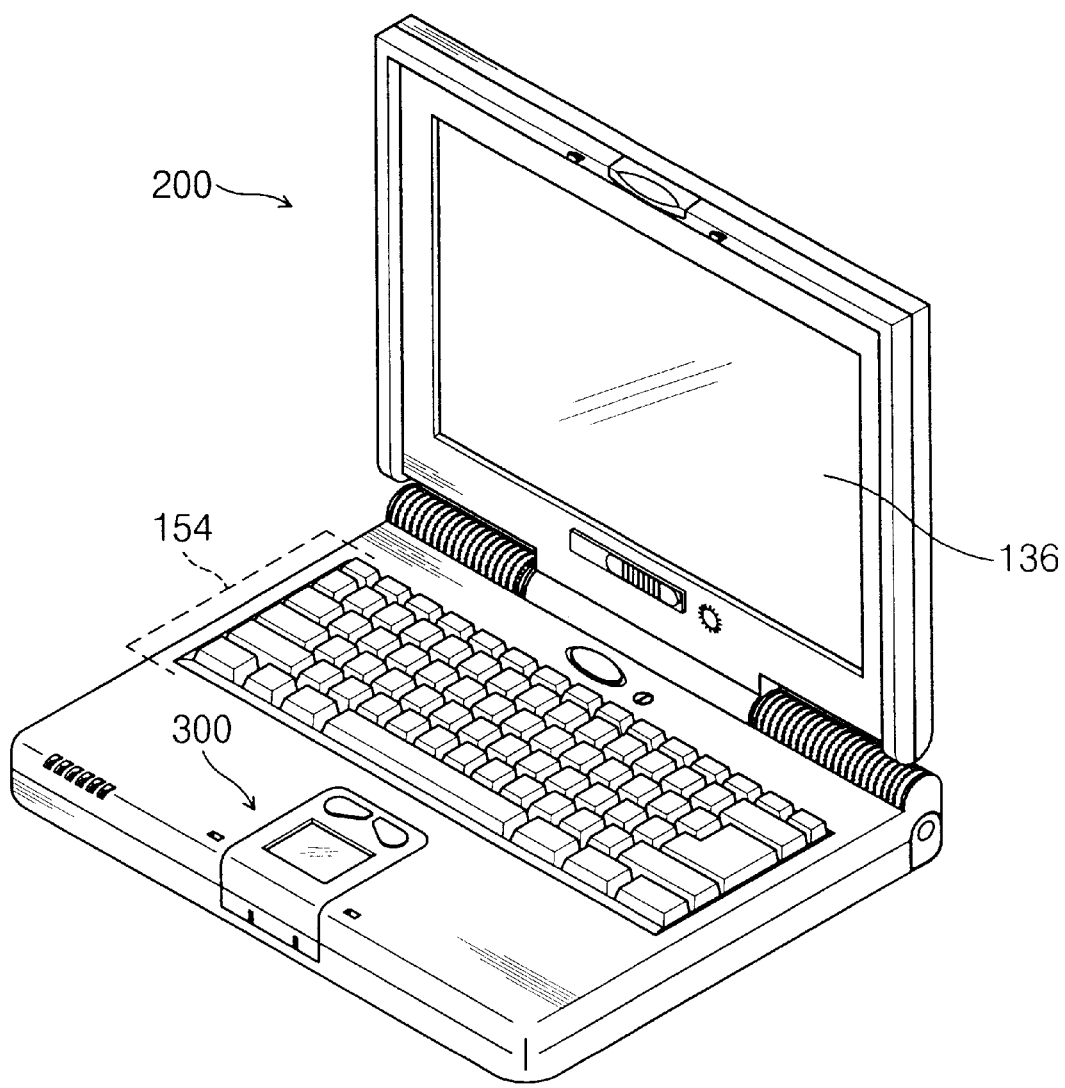
FIG. 4 illustrates a portable computer and an integrally formed mouse and touchpad input device, wherein the integrally formed mouse/touchpad is not separated from the body of the portable computer, in accordance with the principles of the present invention.

With reference to FIGS. 3 and 4, a pointing device 300 with two types of input devices is detachably attached to a notebook computer system 200. The pointing device 300 serves as a mouse to transmit pointing data to the computer system 200 by means of a radio transmitter when detached from the computer system 200, as shown in FIG. 3. The pointing device 300 serves as a touch pad to transmit the pointing data to the computer system by means of a wire connection (not shown) when attached to the computer system 200, as shown in FIG. 4.

Figure 5A:
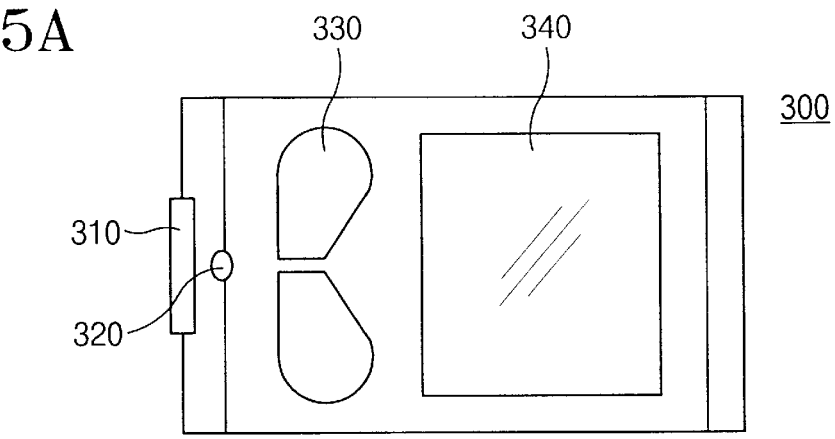
FIG. 5A is a top view of the input device of FIG. 3, in accordance with the principles of the present invention.
Figure 5B:
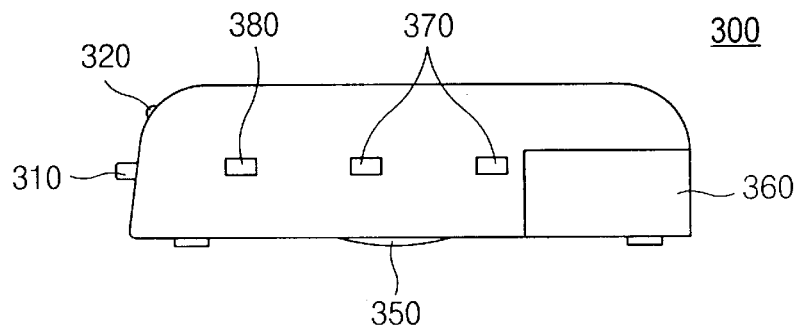
FIG. 5B is a side view of the input device of FIG. 3, in accordance with the principles of the present invention.
Figure 5C:
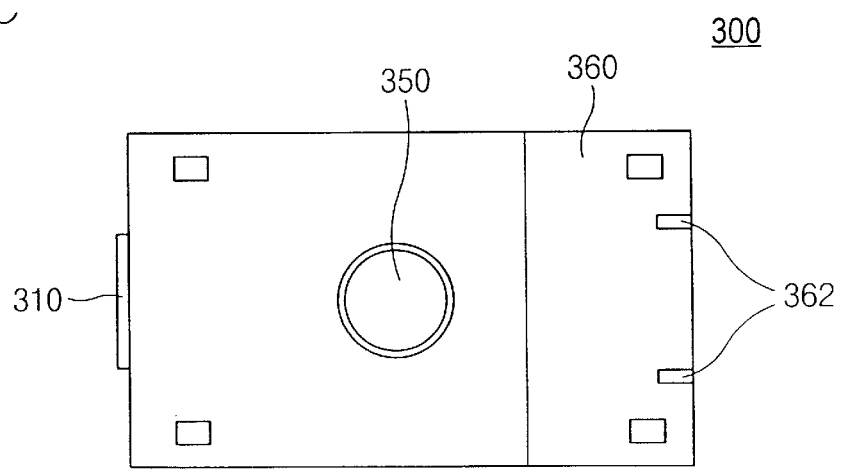
FIG. 5C is a bottom view of the input device of FIG. 3, in accordance with the principles of the present invention.

Refer now to FIG. 5A, which is a top view of the input device of FIG. 3, in accordance with the principles of the present invention. Refer to FIG. 5B, which is a side view of the input device of FIG. 3, in accordance with the principles of the present invention. Refer to FIG. 5C, which is a bottom view of the input device of FIG. 3, in accordance with the principles of the present invention.

Figure 6:
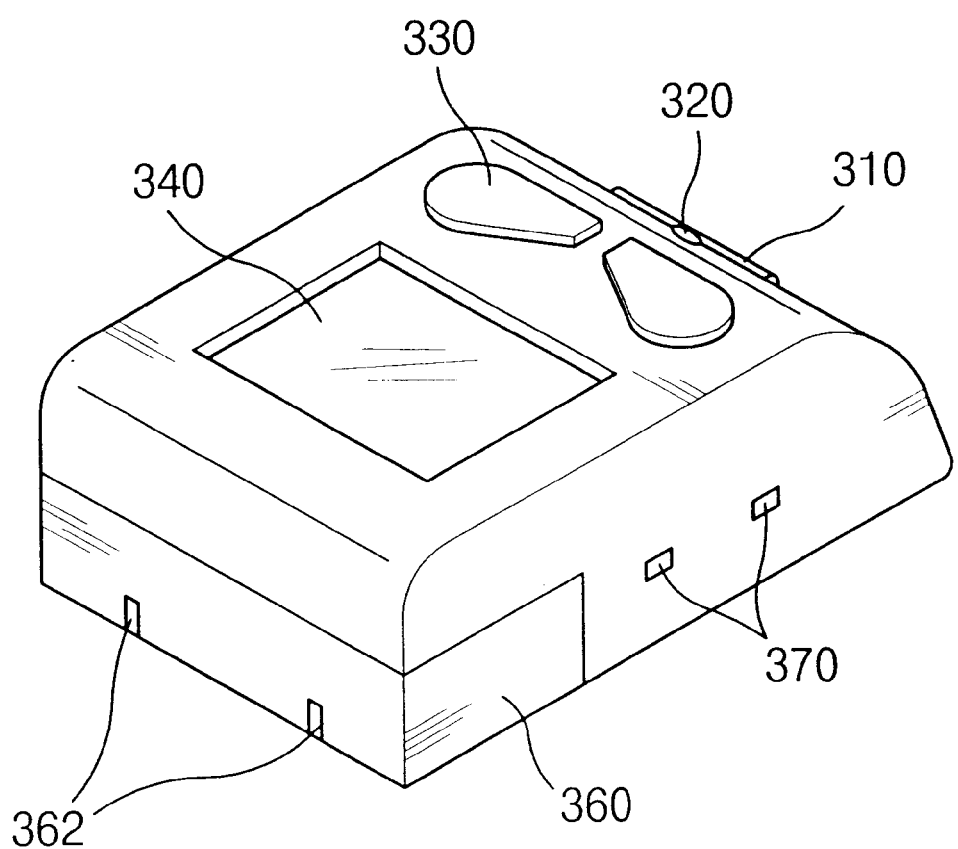
FIG. 6 is a perspective view illustrating the input device of FIGS. 5A, 5B, and 5C, in accordance with the principles of the present invention.

As shown in FIGS. 5A to 5C, the pointing device 300 includes in a housing a touch pad 340 sensing a finger touch and a key pad 330 with a right and a left key for a key input. An alternative embodiment includes three keys corresponding to a left mouse button, a center mouse button, and a right mouse button for clicking and selecting. The front side of the pointing device 300 has an electrical connector 310 connected with the computer system and a radio transmitter 320 transmitting the pointing data to the system. Provided on one side of the pointing device 300 is a contact switch 380 to detect whether the pointing device 300 is attached to the computer system 200 or not attached. In addition, there are lugs 370 provided on both sides of the pointing device 300 to prevent it from being unintentionally detached from the computer system 200. A tracking ball 350 is mounted in the lower side of the pointing device, protruding outwardly to contact the surface on which the pointing device 300 is laid. A battery 360 is provided in the rear side thereof. FIG. 6 is a perspective view illustrating the input device of FIGS. 5A, 5B, and 5C, in accordance with the principles of the present invention.

The pointing device 300 may be operated by touching the touch pad 340 with a finger when attached to the computer system, or by moving the housing to rotate the ball 350 when detached from the computer system. By means of the contact switch 380, a determination is made as to whether the pointing device 300 is attached to the computer system 200 or not attached, so that the pointing device 300 may transmit the pointing data to the computer system through the radio transmitter 320 or through the wire connection via the electrical connector 310.

Figure 7:
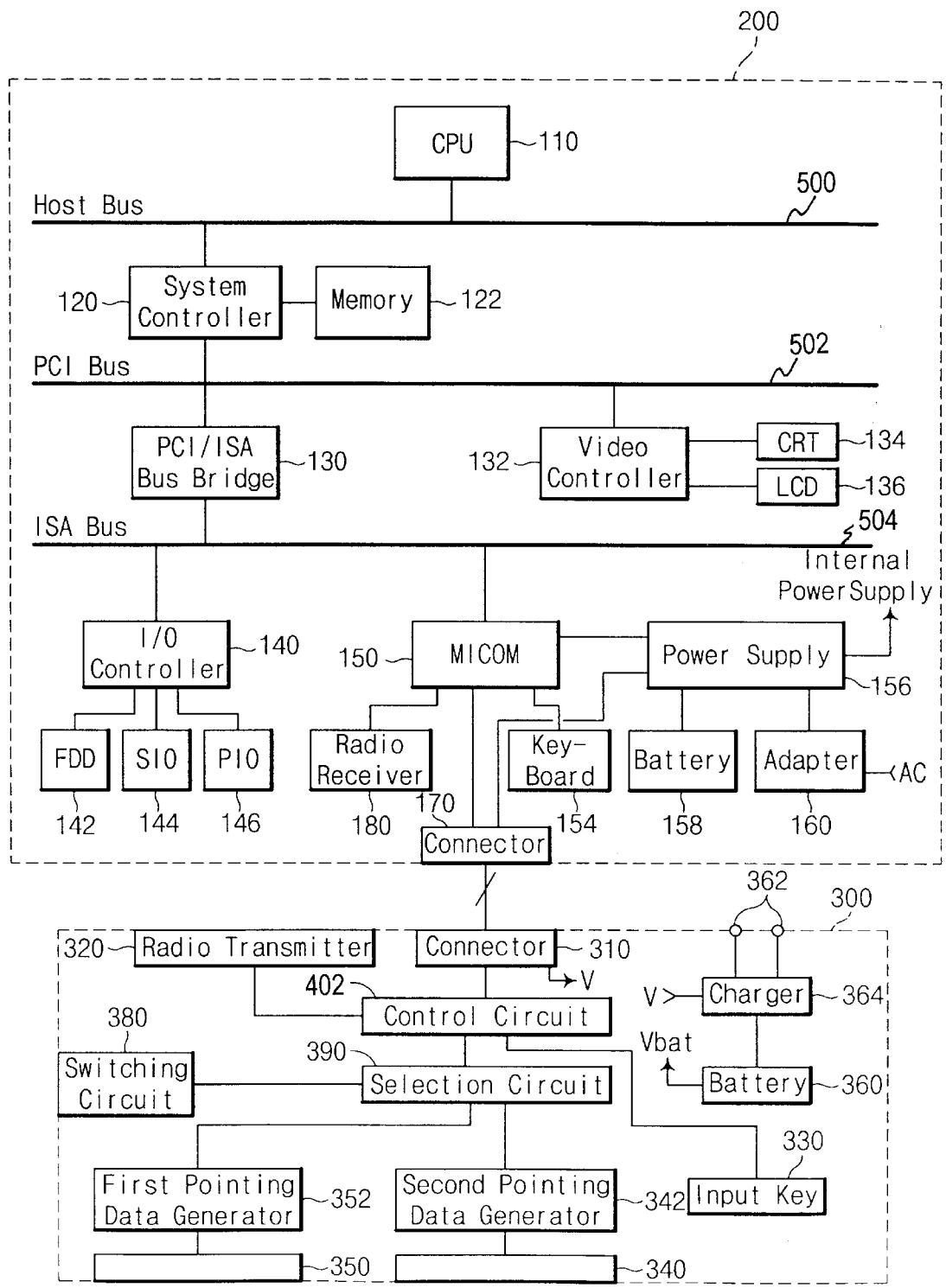
FIG. 7 is a block diagram illustrating a structure of the input device and the portable computer of FIG. 3 when the input device is connected directly with the portable computer, in accordance with the principles of the present invention.

Refer now to FIG. 7, which is a block diagram illustrating a structure of the input device and the portable computer of FIG. 3 when the input device is connected directly with the portable computer, in accordance with the principles of the present invention. Additionally, refer to FIG. 8, which is a block diagram illustrating a structure of the input device and the portable computer of FIG. 3 when the input device is not connected directly with the portable computer, in accordance with the principles of the present invention.

Figure 8:
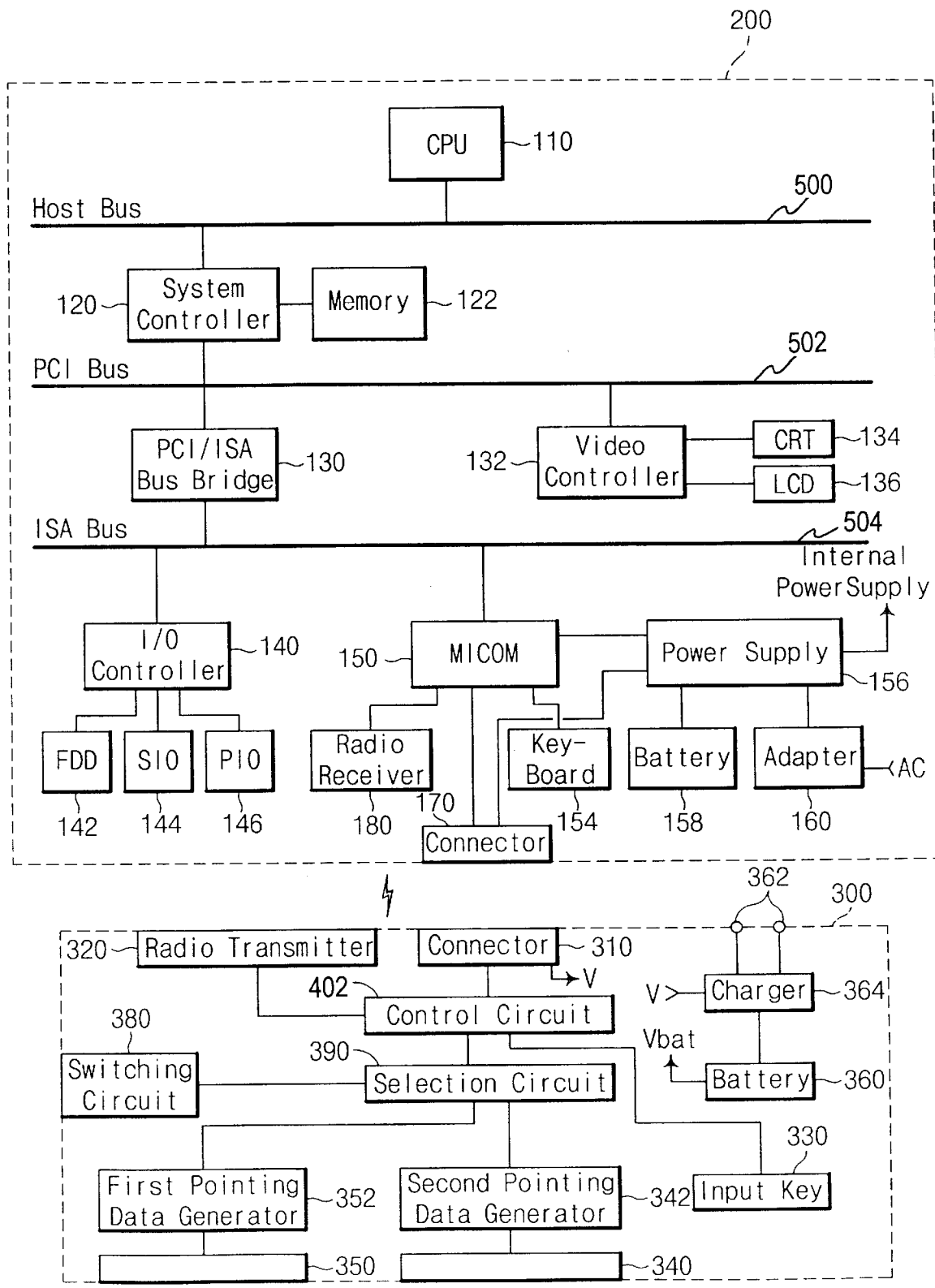
FIG. 8 is a block diagram illustrating a structure of the input device and the portable computer of FIG. 3 when the input device is not connected directly with the portable computer, in accordance with the principles of the present invention.

The functional relationship between the pointing device 300 and the computer system 200 can be explained with reference to FIGS. 7 and 8 as follows. A central processing unit (CPU) 110 of the computer system 200 is connected with a host bus 500. A system controller 120 controls the data transfer between the host bus 500 and a peripheral component interconnect (PCI) bus 502, and the access to the memory 122. The video controller 132 is connected with the peripheral component interconnect (PCI) bus 502 to display the video data on a cathode ray tube (CRT) monitor 134 or a liquid crystal display (LCD) 136. The input/output (I/O) controller 140 is connected with a floppy disk drive (FDD) 142, a serial input/output (SIO) port 144 and parallel input/output (PIO) port 146 to control the data transfer between the system 200 and peripheral units. Additionally provided are a connector 170 for connecting the system 200 with the pointing device 300, a radio receiver 180 for receiving the radio pointing data generated from the radio transmitter 320 of the pointing device 300, and a microprocessor (MICOM) 150 for processing the pointing data. The microprocessor 150 controls the keyboard 154, the battery 158, and the power supply 156 supplying the power from the adapter 160 receiving alternating current (AC) power.

The charger 364 in the pointing device 300 is used to charge the battery 360. The battery 360 is used to provide power to the components of the pointing device 300. When the pointing device 300 is separated from the system 200, the components of the pointing device 300 receive power from the battery 360. When the pointing device 300 is connected to the system 200, power from the power supply 156 can be supplied to the pointing device 300 via the connectors 170 and 310. The battery 360 of the pointing device 300 can receive power from the power supply 156 of the system 200. Also, the battery 360 of the pointing device 300 can receive power from an external battery charger.

The pointing device 300 includes a first and a second pointing data generator 352 and 342 together with the ball 350 and touch pad 340. The first pointing data generator 352 generates the pointing data corresponding to the rotation of the ball 350 while the second pointing data generator 342 generates the pointing data corresponding to the finger touching of the touch pad 340. The switching circuit 380 is turned on or off to make the selection circuit 390 select the pointing data generated by the second or first pointing data generator 342 or 352. Thus, when the pointing device 300 is attached to the computer system 200 causing the switching circuit 380 to turn on, the pointing device 300 serves as the touch pad utilizing touch pad 340 and the second pointing data generator 342. When the pointing device 300 is not attached to the computer system 200 causing the switching circuit 380 to turn off, the pointing device 300 serves as the mouse utilizing the ball 350 and the first pointing data generator 352 and the radio transmitter 320.

Figure 9:
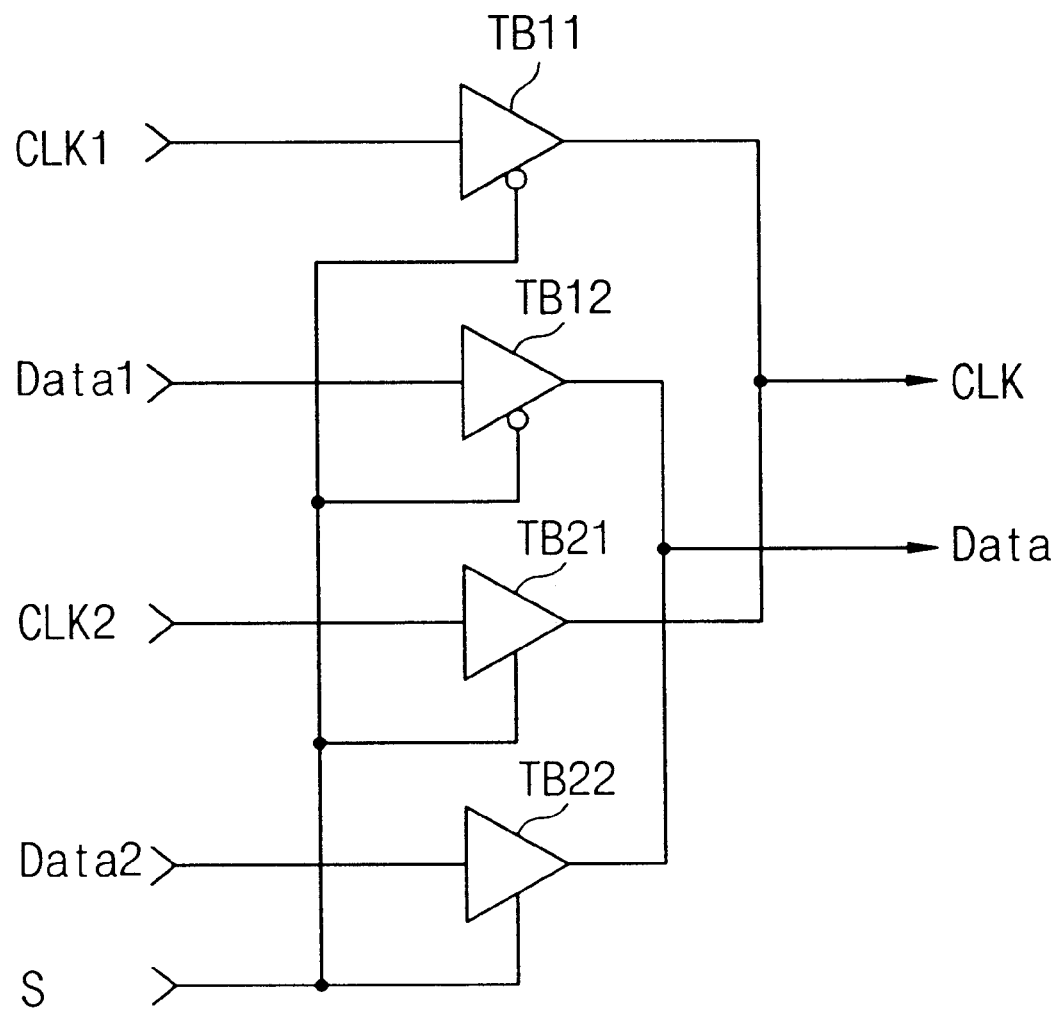
FIG. 9 is a circuit diagram illustrating the structure of the selection circuit of FIG. 7.

Refer now to FIG. 9, which is a circuit diagram illustrating the structure of the selection circuit of FIG. 7. The selection circuit, as shown in FIG. 9, may consist of four three phase buffers TB11, TB12, TB21, and TB22. In accordance with the switching circuit 380 being turned off or on, the first and second three phase buffers TB11 and TB12 respectively receive the clock signal CLK1 and data signal Data1 of the first pointing data generator 352, and the third and fourth three phase buffers TB21 and TB22 respectively receive the clock signal CLK2 and data signal Data2 of the second pointing data generator 342. The signal S is output from the switching circuit 380 to the four three phase buffers TB11, TB12, TB21, and TB22.

Figure 11:
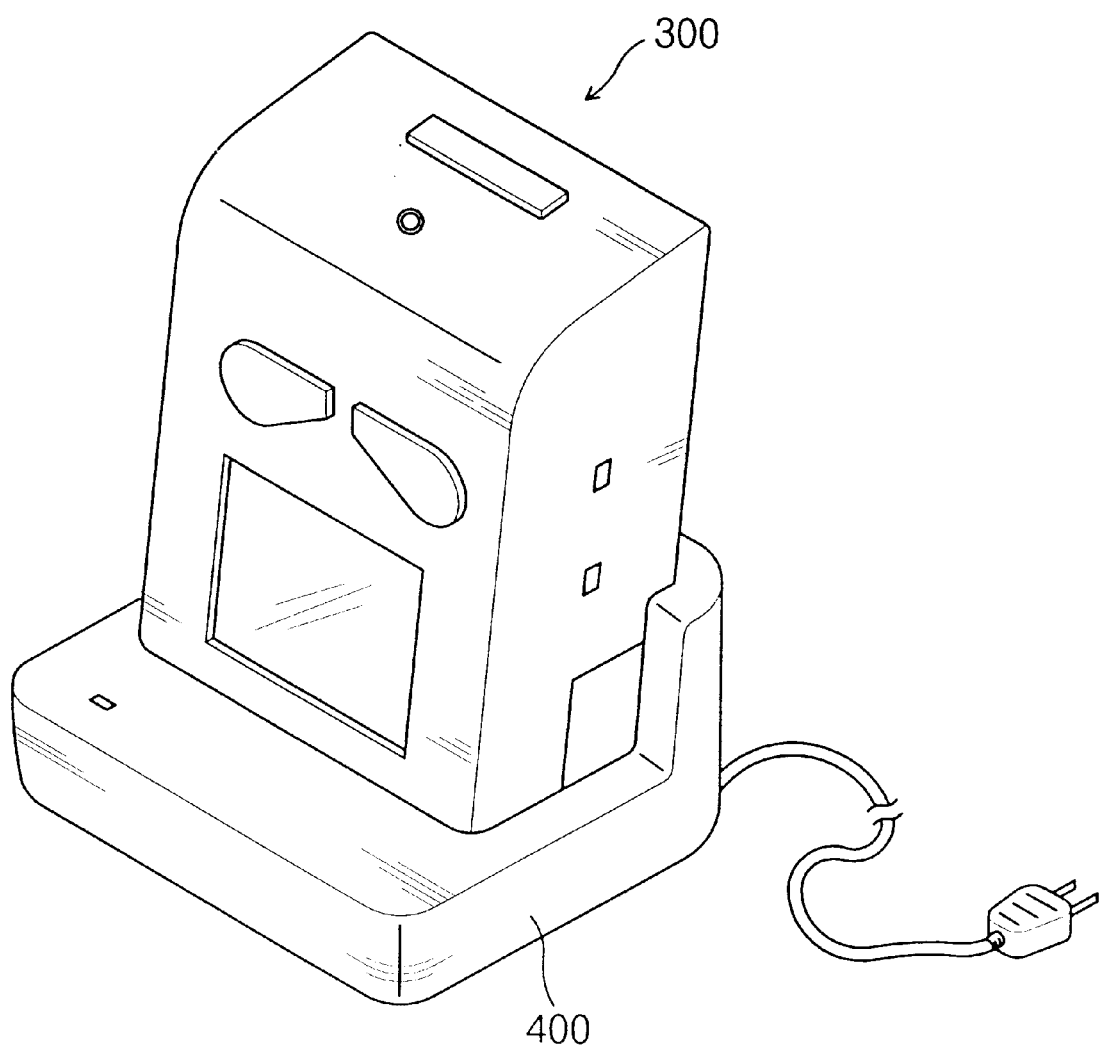
FIG. 11 illustrates the inventive pointing device of FIG. 3 mounted on an external power supply unit, in accordance with the principles of the present invention.

The control circuit 402 controls the pointing data to be transferred to the computer system 200 either through the radio transmitter 320 or the connector 310. The storage battery 360 receives s the power from the computer system 200 through the connector 310 when the pointing device 300 is attached to the computer system, and supplies the power to the pointing device 300 detached from the computer system 200. With reference to FIG. 11, which illustrates the inventive pointing device of FIG. 3 mounted on an external power supply unit, in accordance with the principles of the present invention, an additional battery charger 400 may be used to charge the battery 360 when the pointing device 300 serves as the wireless ball mouse.

Thus, when the pointing device 300 is attached to the computer system 200 connecting the connector 310 with the connector 170, it serves as the touch pad to transfer the pointing data to the computer system 200 through the connectors, as shown in FIG. 7. On the other hand, when detached from the computer system 200, the pointing device 300 serves as the wireless ball mouse to transfer the pointing data through the radio transmitter 320 to the radio receiver 180 of the computer system 200, as shown in FIG. 8.

Figure 10:
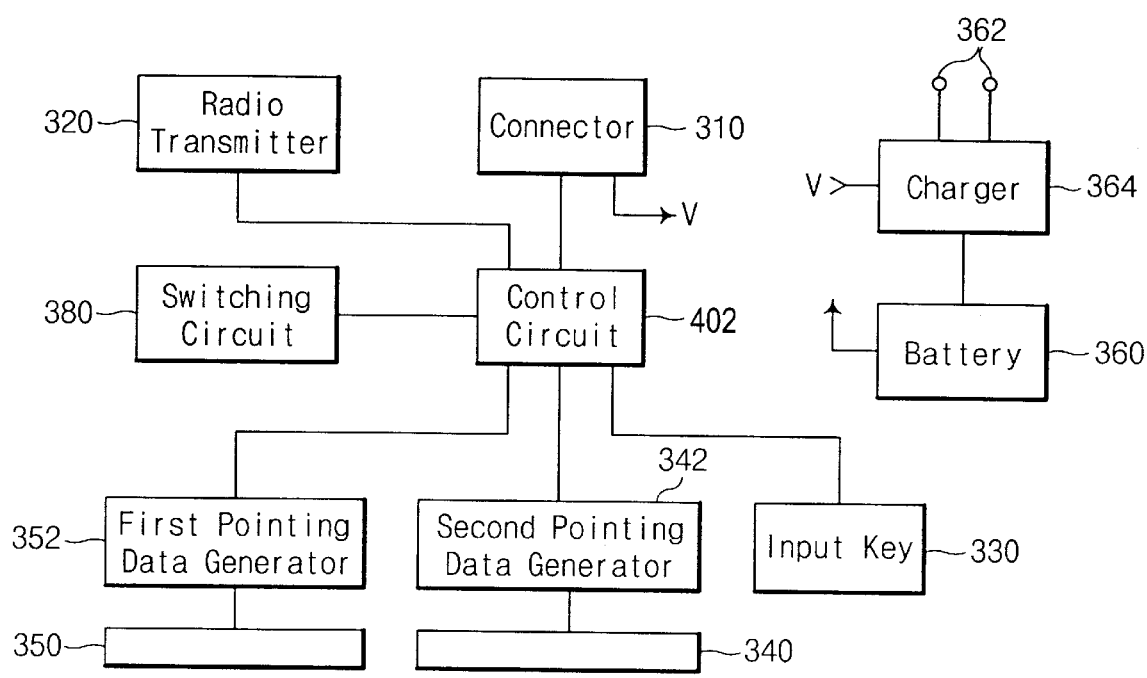
FIG. 10 is a block diagram illustrating the structure of an input device according to another embodiment of the present invention, in accordance with the principles of the present invention.

Refer now to FIG. 10, which is a block diagram illustrating the structure of an input device according to another embodiment of the present invention, in accordance with the principles of the present invention. The selection circuit 390 shown in the pointing device 300 of FIGS. 7 and 8 may be eliminated. As shown in FIG. 10, a pointing device 300a is shown without a selection circuit 390. In FIG. 10, the selection signal of the switching circuit 380 is directly transferred to the control circuit 402, which serves as the touch pad or ball mouse according to whether the selection signal is turned on or off.

Figure 12:
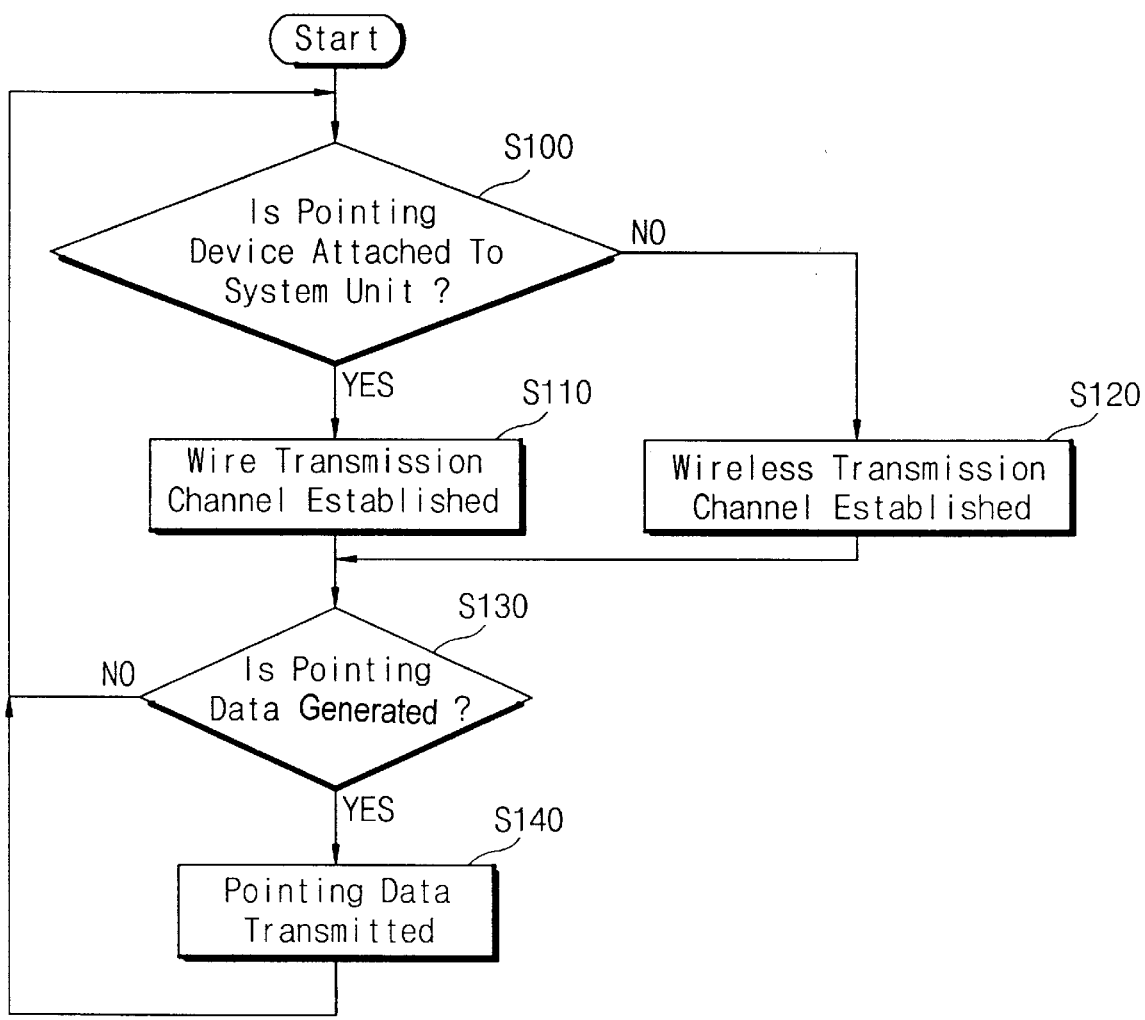
FIG. 12 is a flowchart illustrating the steps of controlling the pointing data by a microprocessor in a computer system provided with the inventive input device of FIG. 3, in accordance with the principles of the present invention.

Refer now to FIG. 12, which is a flowchart illustrating the steps of controlling the pointing data by a microprocessor in a computer system provided with the inventive input device of FIG. 3, in accordance with the principles of the present invention. Referring to FIG. 12, the microprocessor (MICOM) 150 provided in the computer system 200 controls the pointing device 300 as follows. At step S100, the state of the connector 310 of the pointing device 300 is checked to determine whether the pointing device 300 is attached to the computer system 200 or is not attached to the computer system 200. At step S110, when the pointing device 300 is determined to be attached to the computer system 200, the wire transmission channel is established through the connectors 310 and 170, so that the pointing device 300 can be used as a touchpad input device. At step S120, when pointing device 300 is determined to be not attached to the computer system 200, the wireless communication channel is established through the radio receiver 180 and the radio transmitter 320, so that the pointing device 300 can be used as a wireless mouse input device. At step S130, a determination is made as to whether pointing data is generated. At step S140, when pointing data is generated, the pointing data is transmitted. Or otherwise, step S100 is performed again.

Figure 13:
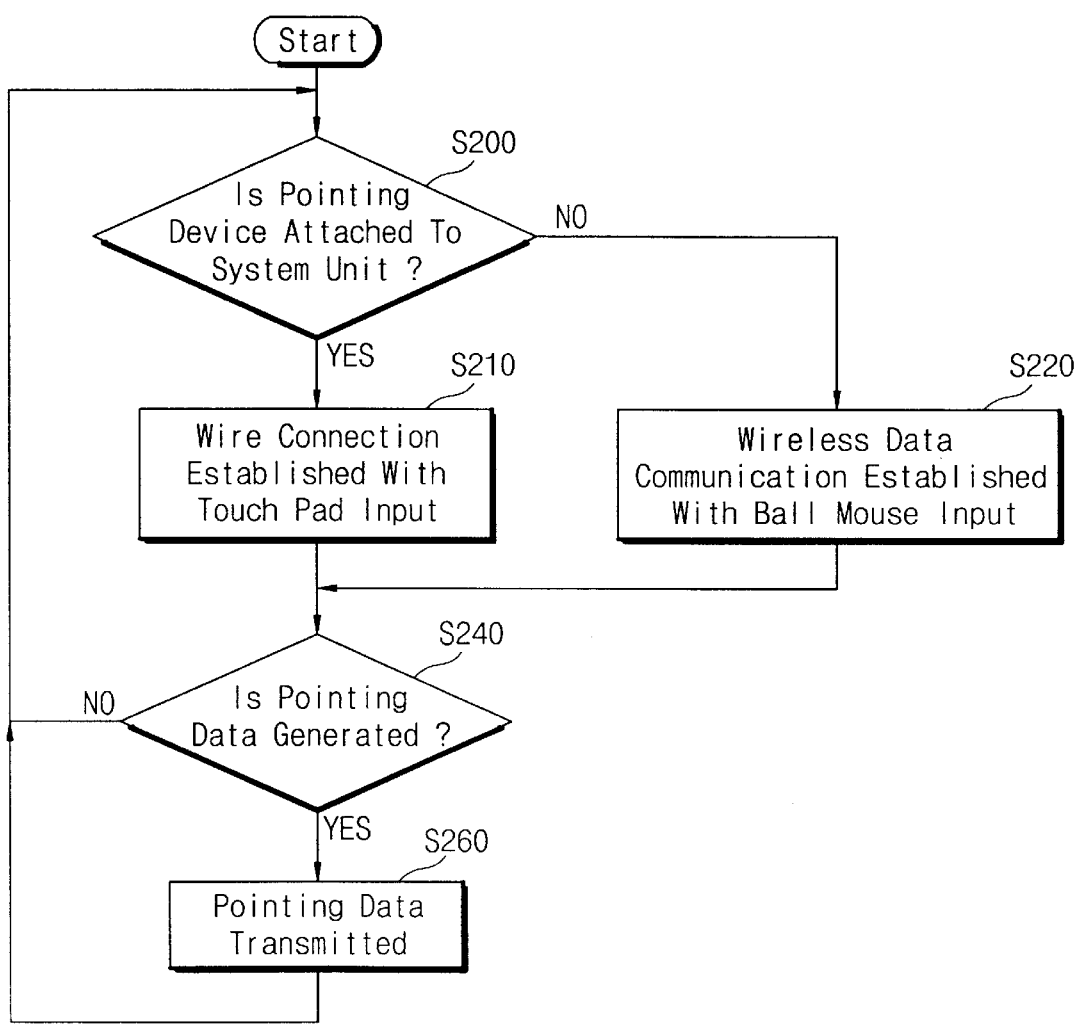
FIG. 13 is a flowchart illustrating the steps of controlling the pointing data by a control circuit of the inventive input device of FIG. 3, in accordance with the principles of the present invention.

Refer now to FIG. 13, which is a flowchart illustrating the steps of controlling the pointing data by a control circuit of the inventive input device of FIG. 3, in accordance with the principles of the present invention. Referring to FIG. 13, the control circuit 402 as shown in FIGS. 7, 8, and 10 controls the pointing data of the pointing device 300 as follows. At step S200, the state of the switching circuit 380 of the pointing device 300 is checked to determine whether the pointing device 300 is attached to the computer system 200 or is not attached to the computer system 200. At step S210, when the pointing device 300 is determined to be attached to the computer system 200, the wire connection is established through the connectors 310 and 170, so that the pointing device 300 can be used as a touchpad. At step S220, when pointing device 300 is determined to be not attached to the computer system 200, the wireless communication is established through the radio receiver 180 and the radio transmitter 320, so that the pointing device 300 can be used as a wireless mouse. At step S240, a determination is made as to whether pointing data is generated. At step S260, when pointing data is generated, the pointing data is transmitted. Or otherwise, step S200 is performed again.

As described above, the inventive pointing device may serve as the touch pad or ball mouse to transmit the pointing data through the wire or wireless communication channel according to whether it is attached to the computer system or not, thus increasing the feasibility. The present invention causes the computer to be more convenient to use. Also, operations on a computer incorporating the present invention can be performed more efficiently than since the pointing device is versatile and offers a user a choice.

While there have been illustrated and described what are considered to be preferred embodiments of the present invention, it will be understood by those skilled in the art that various changes and modifications may be made, and equivalents may be substituted for elements thereof without departing from the true scope of the present invention. In addition, many modifications may be made to adapt a particular situation to the teaching of the present invention without departing from the central scope thereof. Therefore, it is intended that the present invention not be limited to the particular embodiment disclosed as the best mode contemplated for carrying out the present invention, but that the present invention includes all embodiments falling within the scope of the appended claims.

What is claimed is:

1. A pointing apparatus for use with a computer, comprising:

an apparatus housing being removably attached to a host computer;

a first input unit being formed integrally with said apparatus housing and generating first pointing data to be conveyed to said host computer via wireless communication when said apparatus housing is not attached to said host computer;

a second input unit being formed integrally with said apparatus housing and generating second pointing data to be conveyed to said host computer via an electrical connector when said apparatus housing is attached to said host computer; and a switching unit outputting a selection signal when said apparatus housing is attached to said host computer, and not outputting said selection signal when said apparatus housing is not attached to said host computer.

2. The apparatus of claim 1, wherein said host computer corresponds to a portable computer.

3. The apparatus of claim 1 further comprising a plurality of input keys being mounted to said apparatus housing and inputting key data to said apparatus to be conveyed to said host computer.

4. The apparatus of claim 3, wherein said key data are conveyed to said host computer via said wireless communication when said apparatus housing is not attached to said host computer and said key data are conveyed to said host computer via said electrical connector when said apparatus housing is attached to said host computer.

5. The apparatus of claim 3, said apparatus housing having first and second spaced-apart surfaces, said first pointing data corresponding to position coordinate information, and said second pointing data corresponding to said position coordinate information.

6. The apparatus of claim 5, wherein said plurality of input keys are mounted to said second surface of said apparatus housing.

7. The apparatus of claim 1, said apparatus housing having first and second spaced-apart surfaces, said first pointing data corresponding to position coordinate information, and said second pointing data corresponding to said position coordinate information.

8. The apparatus of claim 7, wherein said first input unit further comprises:

a ball rotatably mounted at said first surface of said apparatus housing; and a first data generator unit performing said generating of said first pointing data corresponding to a rotation of said ball.

9. The apparatus of claim 8, wherein said second input unit further comprises:

a touchpad unit detecting physical contact with said touchpad unit; and a second data generator performing said generating of said second pointing data corresponding to said physical contact detected by said touchpad unit.

10. The apparatus of claim 1, wherein said apparatus further comprises:

a control unit receiving said selection signal from said switching unit, and controlling said first pointing data and said second pointing data in accordance with said selection signal, said second pointing data being transmitted as an electrical signal to said host computer via said electrical connector when said selection signal is received, and said first pointing data being transmitted as a wireless signal to said host computer via said wireless communication when said selection signal is not received;

a radio transmitter unit transmitting said first pointing data as said wireless signal to said host computer;

said electrical connector transmitting said second pointing data as said electrical signal to said host computer; and a battery supplying power to said apparatus.

11. The apparatus of claim 10, wherein said electrical connector corresponds to an electrical cable.

12. The apparatus of claim 10, wherein said apparatus further comprises a selection unit receiving said first and second pointing data and said selection signal, and conveying said first and second pointing data to said control unit.

13. The apparatus of claim 12, wherein said selection unit further comprises:

first and a second buffer receiving said first pointing data generated by said first input unit, outputting said first pointing data when said selection signal is not received, and not outputting said first pointing data when said selection signal is received; and a third and a fourth buffer receiving said second pointing data generated by said second input unit, outputting said second pointing data when said selection signal is received, and not outputting said second pointing data when said selection signal is not received.

14. The apparatus of claim 13, wherein said first, second, third, and fourth buffers correspond to three-phase buffers.

15. The apparatus of claim 10, wherein said electrical connector further comprises a plurality of pins transmitting said second pointing data from said apparatus to said host computer and a plurality of power pins receiving power from said host computer.

16. The apparatus of claim 10, wherein said battery receives power from said host computer when said apparatus housing is attached to said host computer.

17. The apparatus of claim 10, wherein said battery is able to receive power from an external power supply unit.

18. A pointing apparatus for use with a host computer, comprising:

an apparatus housing being removably attached to a host computer and having first and second spaced-apart surfaces;

a plurality of input keys being mounted to said apparatus housing and inputting key data to said apparatus to be conveyed to said host computer;

a first input unit being formed integrally with said apparatus housing and generating first pointing data to be conveyed to said host computer via wireless communication when said apparatus housing is not attached to said host computer, said first pointing data corresponding to position coordinate information;

a second input unit being formed integrally with said apparatus housing and generating second pointing data to be conveyed to said host computer via an electrical connector when said apparatus housing is attached to said host computer, said second pointing data corresponding to said position coordinate information;

a switching unit outputting a selection signal when said apparatus housing is attached to said host computer, and not outputting said selection signal when said apparatus housing is not attached to said host computer;

a control unit receiving said selection signal from said switching unit, and controlling said first pointing data and said second pointing data in accordance with said selection signal, said second pointing data being transmitted as an electrical signal to said host computer via said electrical connector when said selection signal is received, and said first pointing data being transmitted as a wireless signal to said host computer via said wireless communication when said selection signal is not received;

a radio transmitter unit transmitting said first pointing data as said wireless signal to said host computer;

said electrical connector transmitting said second pointing data as said electrical signal to said host computer; and a battery supplying power to said apparatus.

19. The apparatus of claim 16, wherein said controlling of said first and second pointing data performed by said control unit further comprises the steps of:

determining when said apparatus housing is attached to said host computer in accordance with said selection signal;

establishing an electrical cable transmission channel transmitting said second pointing data of said second input unit via said electrical connector when said apparatus housing is attached to said host computer;

establishing a wireless transmission channel transmitting said first pointing data of said first input unit via said radio transmitter when said apparatus housing is not attached to said host computer;

when said electrical cable transmission channel is established, determining when said second pointing data are generated;

when said electrical cable transmission channel is established and said second pointing data are generated, transmitting said second pointing data;

when said wireless transmission channel is established, determining when said first pointing data are generated; and when said wireless transmission channel is established and said first pointing data are generated, transmitting said first pointing data.

20. The apparatus of claim 19, wherein said first input unit further comprises:

a ball rotatably mounted at said first surface of said apparatus housing; and a first data generator unit performing said generating of said first pointing data corresponding to a rotation of said ball.

21. The apparatus of claim 20, wherein said second input unit further comprises:

a touchpad unit detecting physical contact with said touchpad unit; and a second data generator performing said generating of said second pointing data corresponding to said physical contact detected by said touchpad unit.

22. The apparatus of claim 21, wherein said plurality of input keys can be utilized to input said key data when said apparatus housing is attached to said host computer, and said plurality of input keys can be utilized to input said key data when said apparatus housing is not attached to said host computer.

23. The apparatus of claim 22, wherein said key data are conveyed to said host computer via said wireless communication when said apparatus housing is not attached to said host computer and said key data are conveyed to said host computer via said electrical connector when said apparatus housing is attached to said host computer.

24. A computer apparatus, comprising:

a system unit processing computer information;

a housing removably mounted in a cavity defined by said system unit;

first and second input units formed integrally with said housing, said first input unit generating first pointing data to be conveyed to said system unit via wireless communication when said housing is not mounted in the cavity defined by said system unit, and second input unit generating second pointing data to be conveyed to said system unit via a first electrical connector when said housing is mounted in the cavity defined by said system unit; and a switching unit outputting a selection signal in response to whether said housing is mounted in the cavity defined by said system unit.

25. The apparatus of claim 24, wherein said system unit further comprises:

a second electrical connector being coupled with said first electrical connector of said second input unit and receiving said second pointing data via said first electrical connector when said housing is mounted in the cavity defined by said system unit;

a radio receiver unit receiving said first pointing data transmitted from said first input unit when said housing is not mounted in the cavity defined by said system unit; and a microprocessor controlling said first and second pointing data.

26. The apparatus of claim 25, wherein said second electrical connector includes a plurality of pins receiving said second pointing data and a plurality of power pins supplying power to said first and second input units.

27. The apparatus of claim 24, said switching unit not outputting a selection signal when said housing is mounted in the cavity defined by said system unit, and outputting said selection signal when said housing is not mounted in the cavity defined by said system unit.

28. The apparatus of claim 27, wherein said controlling of said first and second pointing data performed by said microprocessor further comprises the steps of:

detecting when said switching unit outputs said selection signal;

establishing an electrical cable transmission channel to receive said second pointing data when said switching unit does not output said selection signal;

establishing a wireless transmission channel by said radio receiver to receive said first pointing data when said switching unit outputs said selection signal;

when said electrical cable transmission channel is established, determining when said second pointing data are generated;

when said electrical cable transmission channel is established and said second pointing data are generated, transmitting said second pointing data;

when said wireless transmission channel is established, determining when said first pointing data are generated; and when said wireless transmission channel is established and said first pointing data are generated, transmitting said first pointing data.

29. The apparatus of claim 24, said switching unit outputting a selection signal when said housing is mounted in the cavity defined by said system unit, and not outputting said selection signal when said housing is not mounted in the cavity defined by said system unit.

30. The apparatus of claim 24, said switching unit outputting a first selection signal when said housing is mounted in the cavity defined by said system unit, and outputting a second selection signal when said housing is not mounted in the cavity defined by said system unit, said first and second selection signals being distinguishable.

* * * * *